(12) United States Patent
Shen

(10) Patent No.: US 11,701,636 B2
(45) Date of Patent: *Jul. 18, 2023

(54) AMBIENT HUMIDITY CONTROL ARTICLE

(71) Applicant: SHANGHAI HENGYUAN MACROMOLECULAR MATERIALS CO., LTD., Shanghai (CN)

(72) Inventor: Sandra Shen, Shanghai (CN)

(73) Assignee: SHANGHAI HENGYUAN MACROMOLECULAR MATERIALS CO., LTD, Shanghai (CN)

( * ) Notice: Subject to any disclaimer, the term of this patent is extended or adjusted under 35 U.S.C. 154(b) by 1343 days.

This patent is subject to a terminal disclaimer.

(21) Appl. No.: 16/084,977

(22) PCT Filed: Jul. 20, 2018

(86) PCT No.: PCT/CN2018/096466
§ 371 (c)(1),
(2) Date: Sep. 14, 2018

(87) PCT Pub. No.: WO2020/000544
PCT Pub. Date: Jan. 2, 2020

(65) Prior Publication Data
US 2020/0298204 A1    Sep. 24, 2020

(30) Foreign Application Priority Data

Jun. 29, 2018 (CN) .......................... 201810697932.4

(51) Int. Cl.
| | |
|---|---|
| *D06M 13/10* | (2006.01) |
| *B01J 20/22* | (2006.01) |
| *D06M 13/188* | (2006.01) |
| *D06M 13/192* | (2006.01) |
| *D06M 101/06* | (2006.01) |

(52) U.S. Cl.
CPC ......... *B01J 20/223* (2013.01); *D06M 13/188* (2013.01); *D06M 13/192* (2013.01); *D06M 2101/06* (2013.01)

(58) Field of Classification Search
CPC ..... C08J 9/365; C06M 13/188; D06M 13/188
See application file for complete search history.

(56) References Cited

U.S. PATENT DOCUMENTS

| | | | | |
|---|---|---|---|---|
| 5,846,450 | A * | 12/1998 | Atkinson | C09K 5/047 252/79 |
| 8,748,723 | B1 * | 6/2014 | Egberg | B01D 53/28 261/99 |
| 9,750,811 | B2 * | 9/2017 | Egberg | B01D 53/1493 |
| 2016/0358244 | A1 * | 12/2016 | Schmitz | G06Q 10/087 |

OTHER PUBLICATIONS

Of Dupont™ Hytrel® Thermoplastic Elastomers design guide, pp. 1 and 9, Nov. 2013.*
"Water Absorbency", Smithers.com (www.smiters.com/industries/packaging/manufacturers-and-user/packaging-materials-testing/paper-testing-other-properties/water-absorbency). 2022.*

* cited by examiner

Primary Examiner — Margaret G Moore
(74) Attorney, Agent, or Firm — H&I Partners; C. Andrew Im; Jean-Christopher Hamann

(57) ABSTRACT

An ambient humidity control article for controlling ambient humidity within 55%-68%. The article includes a substrate having a predetermined water absorbability, and a humidity control layer coated on the substrate and made up of a humidity control composition. The amount of the composition coated on per cubic centimeter of the substrate is 0.54-0.74 grams. The composition includes water and at least one of citrate, lactate and formate. The citrate is at least one of sodium citrate, potassium citrate and calcium citrate. The lactate is at least one of sodium lactate and potassium lactate. The formate is at least one of sodium formate and potassium formate. The weight percentage of each of the citrate, lactate and formate in the composition is 33.3%-84.2%. The water absorption amount of the substrate is not less than 0.5 grams per cubic centimeter.

8 Claims, 2 Drawing Sheets

AMBIENT HUMIDITY CONTROL ARTICLE

RELATED APPLICATIONS

This application is a § 371 application from PCT/CN2018/096466 filed Jul. 20, 2018, which claims priority from Chinese Patent Application No. 201810697932.4 filed Jun. 29, 2018, each of which is herein incorporated by reference in its entirety.

FIELD OF THE INVENTION

The present invention relates specifically to an ambient humidity control article.

BACKGROUND OF THE INVENTION

"Humidity" is an important factor that affects product packaging and storage life in all walks of life. Each product requires a reasonable humidity range to store. For example, the humidity to store Chinese herbal medicine is about 55%-68%, the ambient humidity below the numerical value will increase the loss of the Chinese herbal medicine and reduce the quality of the Chinese herbal medicine, and the ambient humidity above the numerical value will cause the Chinese herbal medicine to rot, resulting in the deterioration of the Chinese herbal medicine and the failure to use them. The humidity to store some food in dry storage room is about 55%-68%, and the ambient humidity below the numerical value will reduce the quality of the food. The ambient humidity above the numerical value will cause food to rot and even cause food poisoning.

In order to control the ambient humidity within 55%-68%, the common method is to use humidity control silica gel to control the ambient humidity. However, the use of humidity control silica gel is not in line with green products. During the manufacture of humidity control silica gel, a lot of wastewater will be produced. In order to protect the environment, many silicone raw material factories are closed for rectification. This has led various industries to start to comprise desiccant product, which is the least important in the original list of materials table, in the procurement list of important materials.

Therefore, there is an urgent need for an alternative to humidity control silica gel, and the alternative must be in line with the green and environment theme.

SUMMARY OF THE INVENTION

The present invention is made for solving the above problems and aims to provide an ambient humidity control article.

The present invention provides an ambient humidity control article for use in controlling ambient humidity within 55%-68%, comprising: the substrate, which has a certain water absorbability; the humidity control layer, which is coated on the substrate and made up of humidity control composition. Wherein the amount of the humidity control composition coated on per cubic centimeter of the substrate is 0.5-0.74 grams, the humidity control composition comprises water and at least one of citrate, lactate and formate. The citrate comprises at least one of sodium citrate, potassium citrate and calcium citrate, the lactate comprises at least one of sodium lactate and potassium lactate, the formate comprises at least one of sodium formate, potassium formate, the weight percentage of the citrate in the humidity control composition is 33.3%-84.2%, the weight percentage of the lactate in the humidity control composition is 33.3%-84.2%, the weight percentage of the formate in the humidity control composition is 33.3%-84.2%, the water absorption amount of the substrate is not less than 0.5 grams per cubic centimeter.

Further, the ambient humidity control article can also have the following features: wherein the humidity control composition comprises one of the citrate, the citrate is sodium citrate, the weight percentage of the citrate in the humidity control composition is 33.3%-84.2%.

Further, the ambient humidity control article can also have the following features: wherein the humidity control composition comprises one of the lactate, the lactate is sodium lactate, the weight percentage of the lactate in the humidity control composition is 33.3%-84.2%.

Further, the ambient humidity control article can also have the following features: wherein the humidity control composition comprises the formate and any one of the citrate and the lactate, the weight percentage of the formate in the humidity control composition is 25%-52.6%, the weight percentage of the citrate in the humidity control composition is 8.3%-31.6%, the weight percentage of the lactate in the humidity control composition is 8.3%-31.6%.

Further, the ambient humidity control article can also have the following features: wherein the weight percentage of the formate in the humidity control composition is 32.7%-41.0%, the weight percentage of the citrate in the humidity control composition is 12%-20%, the weight percentage of the lactate in the humidity control composition is 12%-20%.

Further, the ambient humidity control article can also have the following features: wherein the humidity control composition comprises the formate, the citrate and the lactate, the weight percentage of the formate in the humidity control composition is 25%-52.6%, the weight percentage of the citrate in the humidity control composition is 3%-15.3%, the weight percentage of the lactate in the humidity control composition is 5%-25.3%, the total weight percentage of the citrate and the lactate in the humidity control composition is 8.3%-31.6%.

Further, the ambient humidity control article can also have the following features: wherein the material of the substrate is any one of paper type material, cotton, chemical fiber material, non-woven fabric, felt, porous plastic and mineral-based material.

Further, the ambient humidity control article can also have the following features: package bag, wherein the package bag is used to hold the substrate coated with the humidity control composition.

Further, the ambient humidity control article can also have the following features: wherein the material of the package bag is any one of non-woven fabric, composite plastic, paper-plastic composite and cloth.

The Effect of the Present Invention

The ambient humidity control article according to the present invention comprises: substrate, which have a certain water absorbability; humidity control layer, which is coated on the substrate. Wherein the amount of the humidity control composition coated on per cubic centimeter of the substrate is 0.54-0.74 grams, the humidity control composition comprises water and at least one of citrate, lactate and formate. The citrate comprises at least one of sodium citrate, potassium citrate and calcium citrate, the lactate comprises at least one of sodium lactate and potassium lactate, the formate comprises at least one of sodium formate, potassium formate, the weight percentage of the citrate in the humidity control composition is 33.3%-84.2%, the weight percentage of the lactate in the humidity control composition is 33.3%-84.2%, the weight percentage of the formate in the humidity control composition is 33.3%-84.2%, the water absorption amount of the substrate is not less than 0.5 grams per cubic centimeter. Therefore, the ambient humidity control article of the present invention can control the ambient humidity within 55%-68%, does not need to pre-adjust the objective space, has large capacity of moisture absorption and desorption and can quickly achieve the desired humidity in the objective environment.

Moreover, since the ambient humidity control article of the present invention comprises only citrate, lactate and formate in common, the composition manufactured by using the citrate, lactate and formate is not only cheap, but also safe for human body when manufacturing, environment and the objects to be preserved. In addition, the ambient humidity control article of the present invention is still friendly to the natural environment after being discarded and can be decomposed naturally without causing secondary pollution.

DETAILED DESCRIPTION OF THE PREFERRED EMBODIMENTS

Embodiment 1

Figure 1:
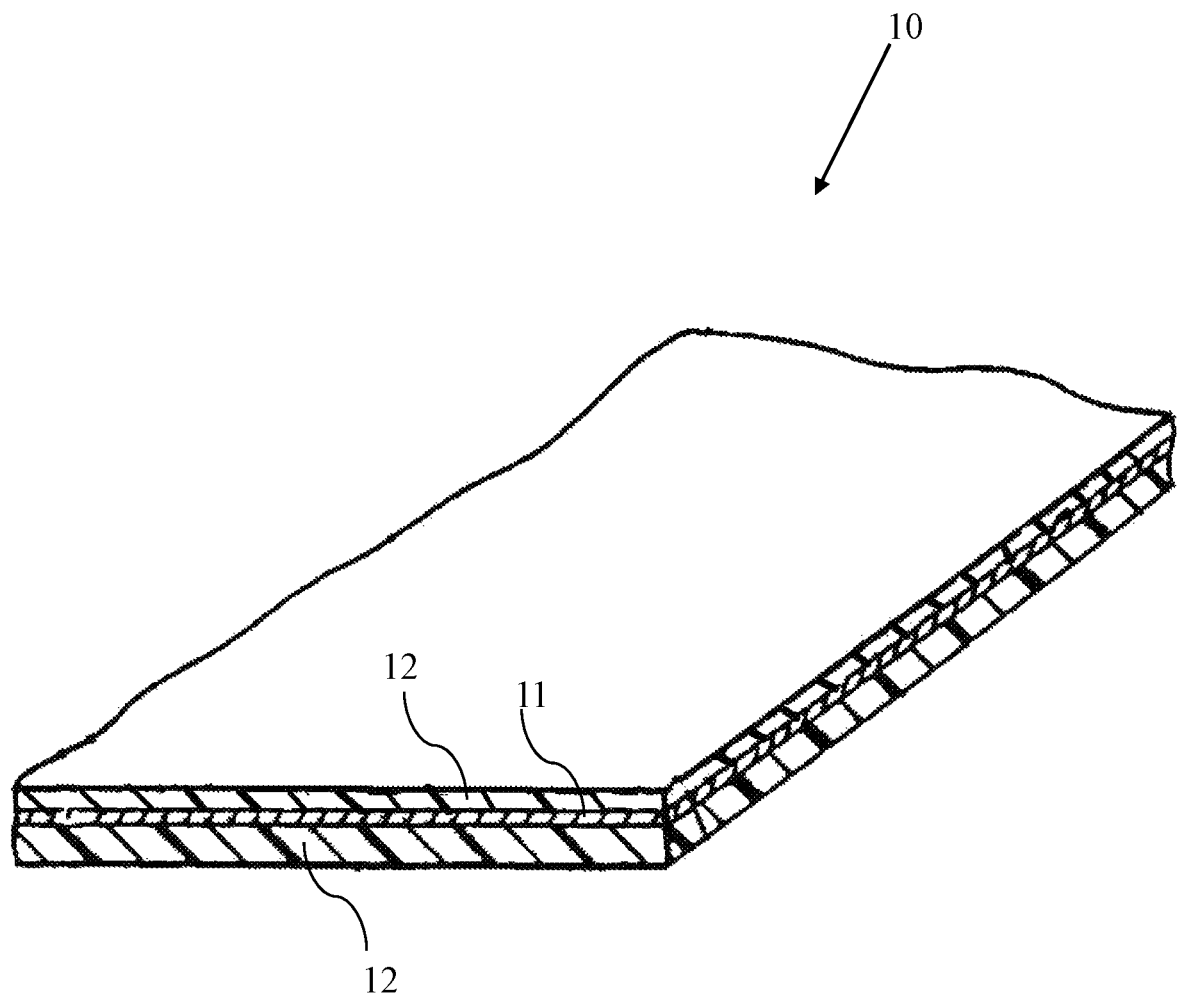
FIG. 1 is a schematic diagram of structure showing the ambient humidity control article in embodiment 1.

FIG. 1 is a schematic diagram of structure showing the ambient humidity control article in embodiment 1.

With respect to FIG. 1, the ambient humidity control article 10 in embodiment 1 is used to control ambient humidity within 55%-68%. The ambient humidity control article 10 comprises substrate 11 and humidity control layer 12 coated on the substrate.

Substrate 11 has a certain water absorbability, the water absorption amount of the substrate is not less than 0.5 grams per cubic centimeter. The material of the substrate is any one of paper type material, cotton, chemical fiber material, non-woven fabric, felt, porous plastic and mineral-based material. In the embodiment 1, cotton-wood pulp paper in paper type material is selected as the substrate. The water absorption amount of the cotton-wood pulp paper is at least 0.8 grams per cubic centimeter, the water-retaining property amount of the cotton-wood pulp paper is at least 1.2 grams per cubic centimeter. For easy tailoring, the thickness of the cotton-wood pulp paper is 0.2 mm-3 mm.

The size of the substrate can be tailored to the needs of customers and the size is 1 cm×1 cm-60 cm×60 cm.

Humidity control layer 12 is made up of humidity control composition. The humidity control composition comprises citrate and water. The citrate is sodium citrate, the weight percentage of sodium citrate in the composition is 33.3%-84.2%.

The purity of the sodium citrate is not less than 99.9%. The water is deionized water.

The amount of the humidity control composition coated on per cubic centimeter of the substrate is 0.54 grams.

Embodiment 2

Figure 2:
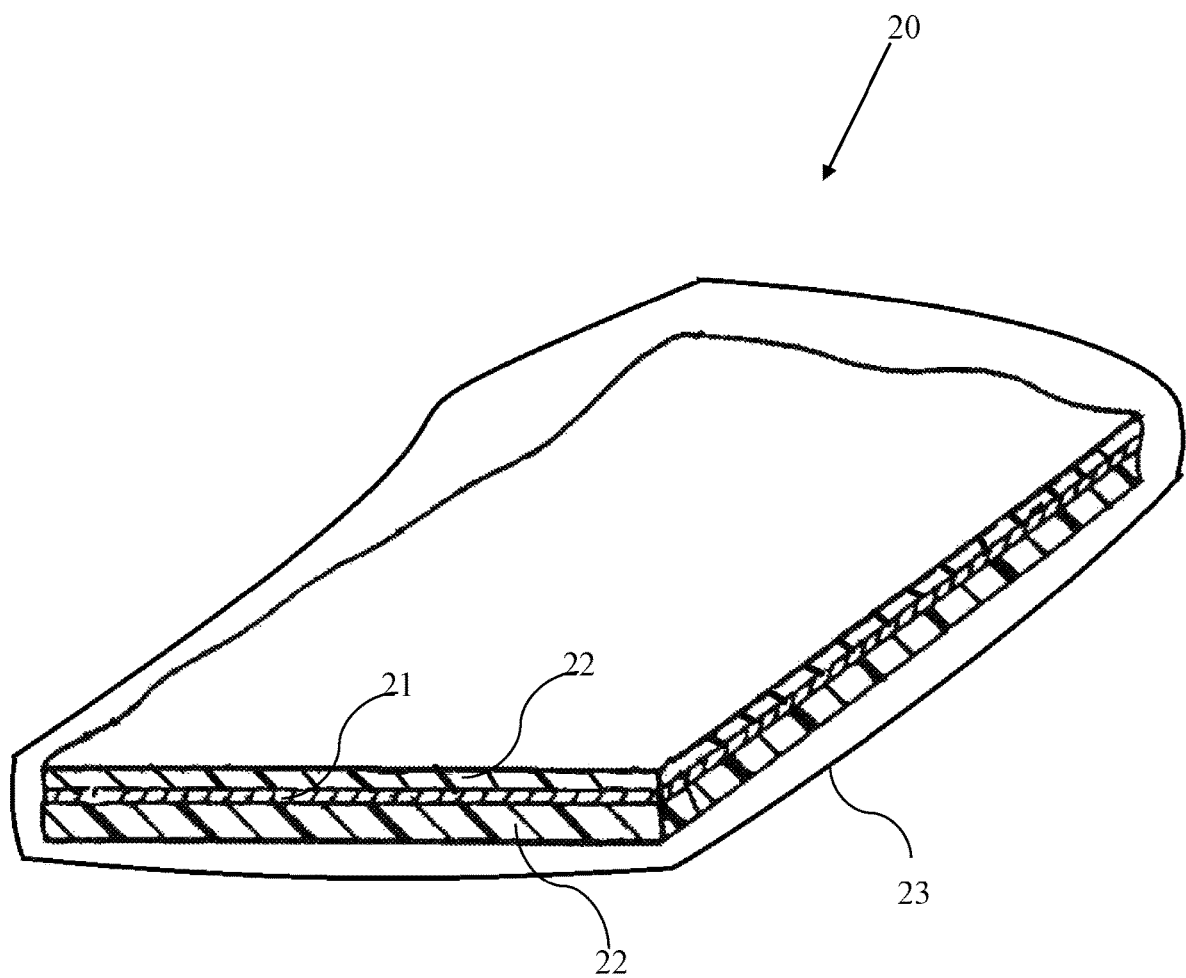
FIG. 2 is a schematic diagram of structure showing the ambient humidity control article in embodiment 2.

FIG. 2 is a schematic diagram of structure showing the ambient humidity control article in embodiment 2.

With respect to FIG. 2, the ambient humidity control article 20 in embodiment 2 comprises substrate 21, humidity control layer 22 coated on the substrate 21 and package bag 23 is used to hold the substrate 21.

Substrate 21 has a certain water absorbability, the water absorption amount of the substrate is not less than 0.5 grams per cubic centimeter. The material of the substrate is any one of paper type material, cotton, chemical fiber material, non-woven fabric, felt, porous plastic and mineral-based material. In the embodiment 2, cotton is selected as the substrate. The water absorption amount of the cotton is at least 0.8 grams per cubic centimeter, the water-retaining property amount of the cotton is at least 1.2 grams per cubic centimeter. For easy tailoring, the thickness of the cotton-wood pulp paper is 2 mm. Considering a substrate having a water absorption amount of not less than 0.5 grams per cubic centimeter, and a paper thickness of 2 mm (or 0.2 cm), the paper substrate has a water absorption of not less than 0.1 grams per square centimeter.

Humidity control layer 22 is made up of humidity control composition, the humidity control composition comprises citrate, formate and water. The citrate is sodium citrate, the formate is sodium formate.

The weight percentage of the sodium formate in the humidity control composition is 25%-52.6%.

The weight percentage of the sodium citrate in the humidity control composition is 8.3%-31.6%.

The purity of the sodium formate and the sodium citrate is not less than 99.9%. The water is deionized water.

The amount of the humidity control composition coated on per cubic centimeter of the substrate is 0.64 grams.

The package bag 23 is used to hold the substrate coated with the humidity control composition. The package bag is made of thin-walled material that can permeate water vapor but not permeate liquid solution such as non-woven fabric, composite plastic, paper-plastic composite and cloth. Non-woven fabric is selected for the material of the package bag in the embodiment 2.

When the weight percentage of the sodium formate and the sodium citrate is greater than the percentage range, crystallization is easy to occur in the composition which requires high temperature to dissolve, resulting in high loss and making the weight of the composition being unstable. When the weight percentage of the sodium formate and the sodium citrate is lower than the percentage range, it takes much longer time to manufacture the ambient humidity control article and the humidity control capability will decrease.

Embodiment 3

In embodiment 3, the same instructions are omitted for the same structure as in embodiment 1.

Humidity control layer 12 is made up of humidity control composition. The humidity control composition comprises lactate and water. The lactate is sodium lactate, the weight percentage of sodium lactate in the humidity control composition is 33.3%-84.2%.

The purity of the sodium lactate is not less than 99.9%. The water is deionized water.

The amount of the humidity control composition coated on per cubic centimeter of the substrate is 0.74 grams.

Embodiment 4

In embodiment 4, the same instructions are omitted for the same structure as in embodiment 1.

Humidity control layer 12 is made up of humidity control composition, the humidity control composition comprises citrate, formate and water. The citrate is sodium citrate, the formate is sodium formate.

The weight percentage of sodium formate in the humidity control composition is 32.7%-41.0%.

The weight percentage of sodium citrate in the humidity control composition is 12%-20%.

The purity of the sodium formate and sodium citrate is not less than 99.9%. The water is deionized water.

The amount of the humidity control composition coated on per cubic centimeter of the substrate is 0.64 grams.

Embodiment 5

In embodiment 5, the same instructions are omitted for the same structure as in embodiment 1.

Humidity control layer 12 is made up of humidity control composition. The humidity control composition comprises lactate, formate and water. The lactate is potassium lactate, the formate is sodium formate.

The weight percentage of sodium formate in the humidity control composition is 25.0%-52.6%.

The weight percentage of potassium lactate in the humidity control composition is 8.3%-31.6%.

The purity of the sodium formate and potassium lactate is not less than 99.9%. The water is deionized water.

The amount of the humidity control composition coated on per cubic centimeter of the substrate is 0.64 grams.

Embodiment 6

In embodiment 6, the same instructions are omitted for the same structure as in embodiment 1.

Humidity control layer 12 is made up of humidity control composition. The humidity control composition comprises lactate, formate and water. The lactate is sodium lactate, the formate is potassium formate.

The weight percentage of potassium formate in the humidity control composition is 25.0%-52.6%.

The weight percentage of sodium lactate in the humidity control composition is 8.3%-31.6%.

The purity of the potassium formate and sodium lactate is not less than 99.9%. The water is deionized water.

Embodiment 7

In embodiment 7, the same instructions are omitted for the same structure as in embodiment 1.

Humidity control layer 12 is made up of humidity control composition. The humidity control composition comprises citrate, lactate, formate and water. The citrate is potassium citrate, the lactate is sodium lactate, the formate is potassium formate.

The weight percentage of potassium formate in the humidity control composition is 25.0%-52.6%.

The weight percentage of potassium citrate in the humidity control composition is 3%-15.3%.

The weight percentage of sodium lactate in the humidity control composition is 5%-25.3%.

The total weight percentage of citrate and lactate in the humidity control composition is 8.3%-31.6%

The purity of the potassium citrate, sodium lactate and potassium formate is not less than 99.9%. The water is deionized water.

Embodiment 8

In embodiment 8, the same instructions are omitted for the same structure as in embodiment 1.

Humidity control layer 12 is made up of humidity control composition. The humidity control composition comprises formate and water. The formate is potassium formate.

The weight percentage of potassium formate in the humidity control composition is 33.3%-84.2%.

The purity of the potassium formate is not less than 99.9%. The water is deionized water.

Take the embodiment 4 as an example, the amount of the humidity control composition in the ambient humidity control article for use in controlling different ambient humidity is a fixed value and there are all 0.64 grams humidity control composition coating on per cubic centimeter of substrate. However, the weight percentage of sodium citrate, sodium formate and water in the humidity control composition is different, respectively

| Ambient humidity (%) | Sodium citrate (%) | Sodium formate(%) | H$_2$O (%) |
| --- | --- | --- | --- |
| 68 | 32.7 | 18.7 | 48.6 |
| 63 | 35 | 20 | 45 |
| 60 | 40 | 12 | 48 |
| 55 | 41 | 12 | 47 |

The area of the 1 kilogram ambient humidity control article in embodiment 4 is 0.42 m$^2$ and the thickness is 0.3 cm. The ambient humidity control article is used to control the humidity of 1 cubic meters closed space (no external gas exchange), under the condition that the initial temperature is 25° C. and the range of the initial humidity is 10%-90%. The ambient humidity will be controlled within 55%-68% in 24 hours and the humidity control is long-term and effective. If the gas in the closed space is exchanged with the external gas with a humidity range of 30% for a long time, the effective time of humidity control is 1 month.

The Effect of the Embodiments

The ambient humidity control article according to the foregoing invention comprises: substrate, which have a certain water absorbability; humidity control layer, which is coated on the substrate. Wherein the amount of the humidity control composition coated on per cubic centimeter of the substrate is 0.64 grams, the humidity control composition comprises water and at least one of citrate, lactate and formate. The citrate comprises at least one of sodium citrate, potassium citrate and calcium citrate, the lactate comprises at least one of sodium lactate and potassium lactate, the formate comprises at least one of sodium formate and potassium formate, the weight percentage of the citrate in the humidity control composition is 33.3%-84.2%, the weight percentage of the lactate in the humidity control composition is 33.3%-84.2%, the weight percentage of the formate in the humidity control composition is 33.3%-84.2%, the water absorption amount of the substrate is not less than 0.5 grams per cubic centimeter. Therefore, the ambient humidity control article of the foregoing invention can control the ambient humidity within 55%-68%, does not need to pre-adjust the objective space, has large capacity of moisture absorption and desorption and can quickly achieve the desired humidity in the objective environment.

Moreover, since the ambient humidity control article of the foregoing invention comprises only citrate, lactate and formate in common, the composition manufactured by using the citrate, lactate and formate is not only cheap, but also safe for human body when manufacturing, environment and the objects to be preserved. In addition, the ambient humidity control article of the present invention is still friendly to the natural environment after being discarded, and can be decomposed naturally without causing secondary pollution.

The foregoing embodiments are preferred cases of the present invention and is not used to limit the scope of protection of the present invention.

The invention claimed is:

1. An ambient humidity control article for controlling ambient humidity within 55%-68%, comprising:
   a substrate having a predetermined water absorbability;
   a humidity control layer coated on the substrate and comprising humidity control composition;
   wherein an amount of the humidity control composition coated on per cubic centimeter of the substrate is 0.54-0.74 grams;
   the humidity control composition comprises water and at least one of citrate, lactate and formate;
   the citrate comprises at least one of sodium citrate, potassium citrate and calcium citrate;
   the lactate comprises at least one of sodium lactate and potassium lactate;
   the formate comprises at least one of sodium formate and potassium formate;
   a weight percentage of the citrate in the humidity control composition is 33.3%-84.2%;
   a weight percentage of the lactate in the humidity control composition is 33.3%-84.2%;
   a weight percentage of the formate in the humidity control composition is 33.3%-84.2%; and
   said substrate is paper and has a water absorption amount of not less than 0.1 grams per square centimeter.

2. The ambient humidity control article according to claim 1, wherein the humidity control composition comprises one of said citrates and the citrate is the sodium citrate.

3. The ambient humidity control article according to claim 1, wherein the humidity control composition comprises one of said lactates and the lactate is the sodium lactate.

4. An ambient humidity control article for controlling ambient humidity within 55%-68%, comprising:
   a substrate having a predetermined water absorbability;
   a humidity control layer coated on the substrate and comprising humidity control composition;
   wherein an amount of the humidity control composition coated on per cubic centimeter of the substrate is 0.54-0.74 grams;
   the humidity control composition comprises water, a formate and at least one of citrate and lactate;
   the citrate comprises at least one of sodium citrate, potassium citrate and calcium citrate;
   the lactate comprises at least one of sodium lactate and potassium lactate;
   the formate comprises at least one of sodium formate and potassium formate;
   a weight percentage of the formate in the humidity control composition is 25%-52.6%;
   a weight percentage of the citrate in the humidity control composition is 8.3%-31.6%;
   a weight percentage of the lactate in the humidity control composition is 8.3%-31.6%; and
   said substrate is paper and has a water absorption amount of not less than 0.1 grams per square centimeter.

5. The ambient humidity control article according to claim 4, wherein the weight percentage of the formate in the humidity control composition is 32.7%-41.0%; wherein the weight percentage of the citrate in the humidity control composition is 12%-20%; and wherein the weight percentage of the lactate in the humidity control composition is 12%-20%.

6. An ambient humidity control article for controlling ambient humidity within 55%-68%, comprising:
   a substrate having a predetermined water absorbability;
   a humidity control layer coated on the substrate and comprising humidity control composition;
   wherein an amount of the humidity control composition coated on per cubic centimeter of the substrate is 0.54-0.74 grams;
   the humidity control composition comprises water, a formate, a citrate and a lactate;
   the citrate comprises at least one of sodium citrate, potassium citrate and calcium citrate;
   the lactate comprises at least one of sodium lactate and potassium lactate;
   the formate comprises at least one of sodium formate and potassium formate;
   a weight percentage of the formate in the humidity control composition is 25%-52.6%;
   a weight percentage of the citrate in the humidity control composition is 3%-15.3%;
   a weight percentage of the lactate in the humidity control composition is 5%-25.3%;
   a total weight percentage of the citrate and the lactate in the humidity control composition is 8.3%-31.6%; and
   said substrate is paper and has a water absorption amount of not less than 0.1 grams per square centimeter.

7. The ambient humidity control article according to claim 1, further comprising a package bag, the package bag being configured to hold the substrate coated with the humidity control composition.

8. The ambient humidity control article according to claim 7, wherein the package bag comprises one of the following materials: a non-woven fabric, composite plastic, paper-plastic composite and cloth.

* * * * *